(12) United States Patent
Ito et al.

(10) Patent No.: US 7,944,479 B2
(45) Date of Patent: May 17, 2011

(54) IMAGE-CAPTURE APPARATUS, CAMERA CONTROL UNIT, VIDEO CAMERA SYSTEM, AND METHOD OF TRANSMITTING WARNING INFORMATION

(75) Inventors: Yujiro Ito, Kanagawa (JP); Hidekazu Suto, Tokyo (JP)

(73) Assignee: Sony Corporation, Tokyo (JP)

( * ) Notice: Subject to any disclaimer, the term of this patent is extended or adjusted under 35 U.S.C. 154(b) by 992 days.

(21) Appl. No.: 11/823,706

(22) Filed: Jun. 28, 2007

(65) Prior Publication Data

US 2008/0002032 A1 Jan. 3, 2008

(30) Foreign Application Priority Data

Jun. 30, 2006 (JP) ................ P2006-182572

(51) Int. Cl.
*H04N 5/232* (2006.01)
(52) U.S. Cl. ................ 348/211.5; 348/211.99
(58) Field of Classification Search ........... 348/211.99, 348/211.1, 211.4, 211.5, 333.04
See application file for complete search history.

(56) References Cited

U.S. PATENT DOCUMENTS

| 6,535,245 | B1* | 3/2003 | Yamamoto | 348/223.1 |
| 7,619,668 | B2* | 11/2009 | Saka et al. | 348/251 |
| 2002/0012050 | A1* | 1/2002 | Oka et al. | 348/211 |
| 2002/0171756 | A1* | 11/2002 | Bigler et al. | 348/373 |
| 2005/0094004 | A1* | 5/2005 | Gotanda | 348/241 |

FOREIGN PATENT DOCUMENTS

JP 10-304241 11/1998

* cited by examiner

*Primary Examiner* — Kelly L Jerabek
(74) *Attorney, Agent, or Firm* — Frommer Lawrence & Haug LLP; William S. Frommer; Ellen Marcie Emas (57) ABSTRACT

An image-capture apparatus having an intercom connecting unit, capable of voice communication with an external camera control unit (CCU) is provided. The apparatus includes a control unit, a warning-sound signal generator, a receiving unit, a voice synthesizer and a transmitting unit. The control unit outputs a warning-command signal when determining that a control-information signal value indicating a state of the apparatus varies from a predetermined standard. The warning-sound signal generator outputs a warning-sound signal corresponding to the warning-command signal. The receiving unit receives a multiplexed signal from the CCU and extracts an intercom-voice signal at the multiplexed signal. The voice synthesizer combines the intercom-voice signal extracted at the receiving unit with the warning-sound signal from the warning-sound signal generator to generate a voice-synthesized signal. The transmitting unit multiplexes the warning-command signal, the control-information signal, and the intercom-voice signal of the image-capture apparatus and transmits a multiplexed signal to the CCU.

16 Claims, 8 Drawing Sheets

IMAGE-CAPTURE APPARATUS, CAMERA CONTROL UNIT, VIDEO CAMERA SYSTEM, AND METHOD OF TRANSMITTING WARNING INFORMATION

CROSS REFERENCES TO RELATED APPLICATIONS

The present invention contains subject matter related to Japanese Patent Application JP 2006-182572 filed in the Japanese Patent Office on Jun. 30, 2006, the entire contents of which being incorporated herein by reference.

BACKGROUND OF THE INVENTION

1. Field of the Invention

The present invention relates to a video camera system and a method of transmitting warning information, which are suitably applied to a broadcast-use or professional-use video camera system, and an image-capture apparatus and a camera control unit to be applied in such a system.

2. Description of the Related Art

In general, a video camera used in a broadcasting station or the like is designed to check its status. Status information includes gain and electronic shutter speed of the video camera, a remaining amount of battery, and a signal level or the like. The confirmation and settings of control information on the values of those items can be performed with observation through a viewfinder or a liquid crystal monitor. Some of the status information may need to transmit a warning to a photographer using such video camera depending on a change in value of the status information and such warning information may also be displayed on the viewfinder or the liquid crystal display.

A warning may be desired when the remaining amount of the battery of the video camera becomes low or when a signal level of the subject is detected low in a detection system in the inside of the video camera. The photographer of the video camera is allowed to confirm the situation by displaying part of such kinds of warning information, which can suitably be controlled by operating a switch or a knob on the video camera.

Japanese Unexamined Patent Application Publication No. H10-304241 discloses that a viewfinder connecting to a camcorder displays a warning when a value obtained by integrating the luminance in the screen has become a predetermined level or less than that.

SUMMARY OF THE INVENTION

Furthermore, the warning information as described above is displayed every time the need of issuing a warning arises and the photographer should always keep a careful watch over the screen so that the warning information may not be overlooked. However, the photographer should pay attention not only on the above matter but also on, for example, whether a subject is out of focus or whether an image will be well composed. Thus, paying attention even to the presence or absence of warning information on a display screen may be hard on the photographer.

For calling the photographer's attention, a voice-warning device, such as buzzer, may be used. However, a typical video camera is provided with a microphone, so that it is difficult to generate a warning sound while preventing the microphone from recording the sound. In addition, under photographic conditions with a high noise level, the photographer may fail to hear a warning sound.

According to an embodiment of the present invention, there is provided an image-capture apparatus. According to the embodiment, a warning-command signal is output in the case of determining that a value of a control-information signal indicating a state of the image-capture apparatus varies from a predetermined standard. In addition, a warning sound is output in response to the warning-command signal, and an intercom-voice signal extracted at a receiving unit is combined with a warning sound signal and output to an intercom headphone. Furthermore, the warning-command signal, the control-information signal, and the intercom-voice signal of the image-capture apparatus are multiplexed and then transmitted to a camera control unit.

Therefore, the intercom headphone generates a warning sound depending on the contents of the warning. In the case where a voice is input from the intercom, an intercom-voice signal is combined with a warning-sound signal, to be output.

In addition, the warning-command signal generated from the image-capture apparatus is also transmitted to the camera control unit. The camera control unit is also allowed to display warning information and output a warning sound.

According to the embodiment of the present invention, in the case where a malfunction is detected in the video camera, warning information is not only displayed on a viewfinder but also notified as a warning sound through an intercom headphone. Therefore, the notice of warning information can be performed surely.

In addition, in the case where an intercom voice is input from an apparatus on the other end, the intercom voice is combined with warning sound and then generated from the intercom headphone, so that even when the intercom is on hold, a warning sound can be generated. Therefore, the notice of warning information can be performed surely.

DESCRIPTION OF THE PREFERRED EMBODIMENTS

Hereinafter, an embodiment of the present invention will be described with reference to the attached drawings.

Figure 1:
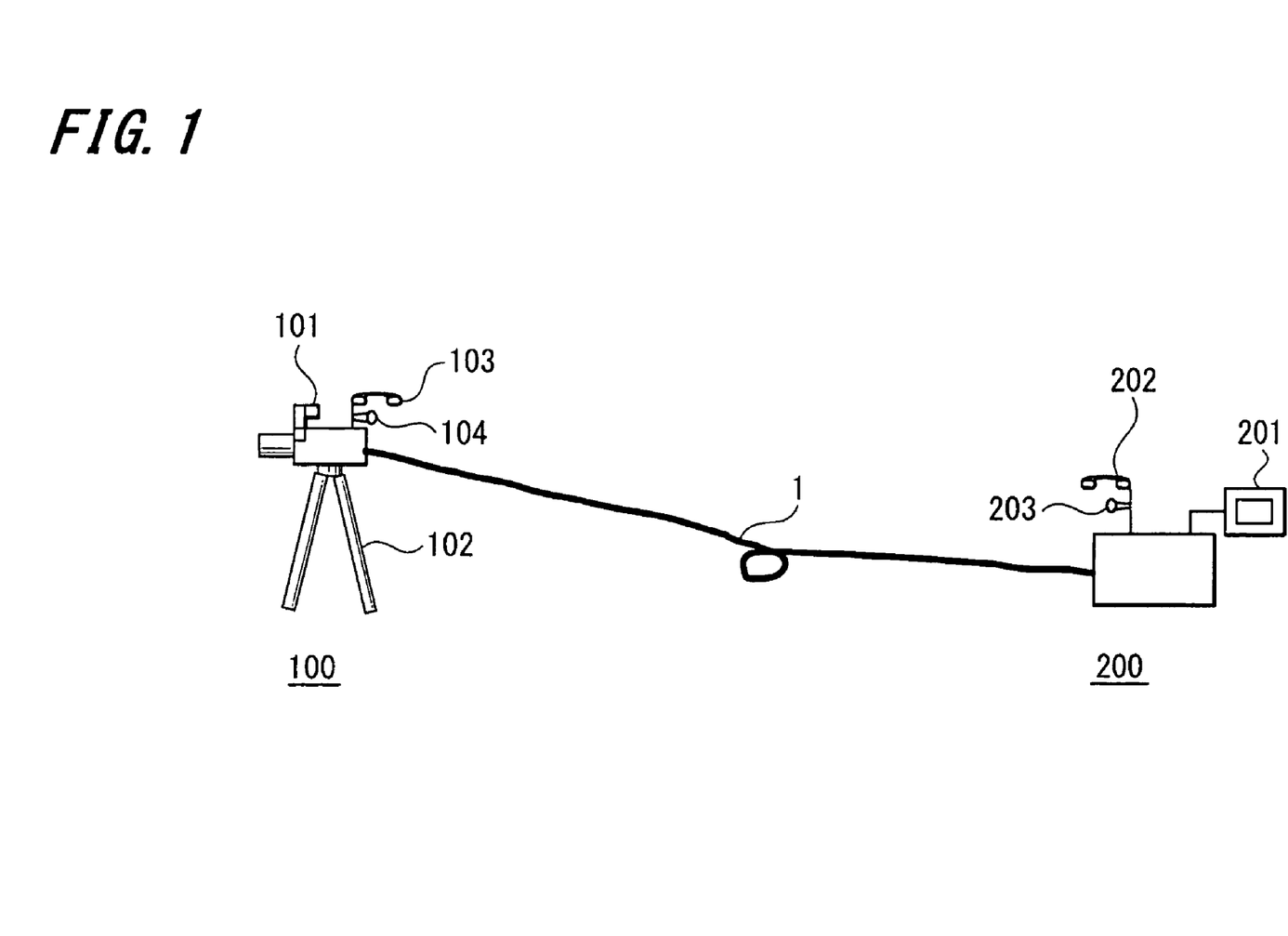
FIG. 1 is a schematic diagram illustrating an example of the connection of a video camera and a CCU according to an embodiment of the present invention.

FIG. 1 is a schematic diagram showing an example of a connection between a video camera as an image-capture apparatus according to the present embodiment and a camera control unit (hereinafter, referred to as CCU). The video camera 100 includes a viewfinder 101. The viewfinder 101 displays not only an image captured by the video camera 100 but also control information such as configuration information of the video camera 100 and status information thereof. The video camera 100 may be placed on a tripod 102 and connected to a CCU 200 through a transmission cable 1. Information transmitted from the video camera 100 to the CCU 200 includes an image and a sound captured by the video camera 100, control information of the video camera 100, and a warning-command signal as described later. In addition, information transmitted from the CCU 200 to the video camera 100 includes a return video signal and a control signal for controlling the video camera 100.

The video camera 100 is provided with an intercom (hereinafter, also referred to as "incom") for communicating with a user of the CCU 200. The video camera is designed so that a photographer of the vide camera 100 is able to communicate by voice with an operator of the CCU 200 using an incom headphone 103 and an incom microphone 104. Likewise, the CCU 200 is also provided with an incom headphone 202 and an incom microphone 203 to communicate with the video camera 100. In addition, the transmission cable 1 for connecting the video camera 100 with the CCU 200 may be a triax cable, an optical fiber cable, or the like.

Next, referring now to a block diagram in FIG. 2, configuration examples of the video camera 100 and the CCU 200 will be described, respectively. The video camera 100 shown in FIG. 2 includes a lens block for capturing a subject image and a camera block for processing an image signal output from the lens block. The lens block includes a lens group that has a focus lens 112 configured to focus a subject image incident on an image-capture lens 110 on an image-capture surface of the image-capture device, a lens drive mechanism 113 configured to drive each lens, a lens driver 111 configured to control movement of the lens drive mechanism and the like.

Figure 2:
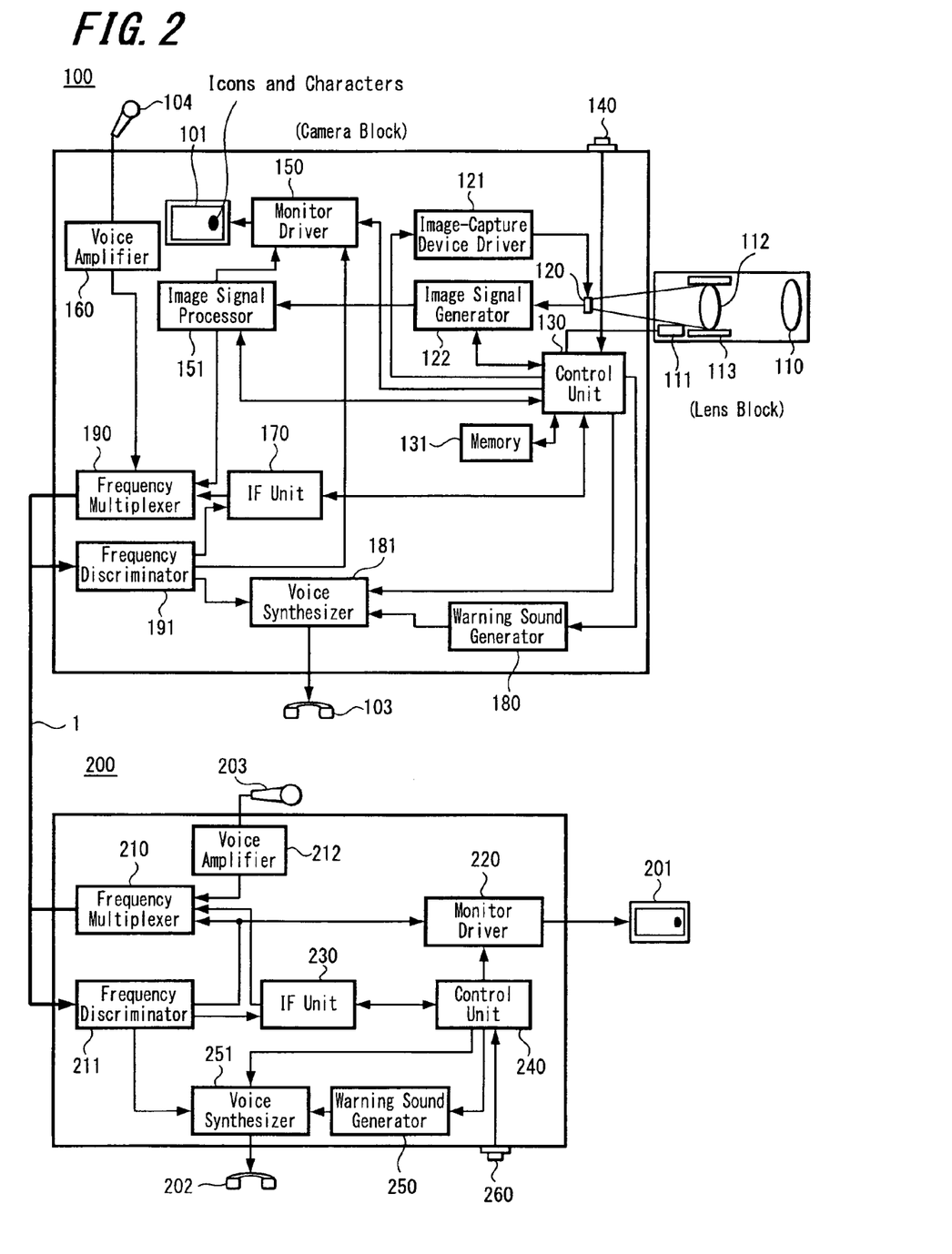
FIG. 2 is a block diagram illustrating a configuration example of the video camera and the CCU according to the embodiment of the present invention.

In the video camera shown in FIG. 2, the subject image is formed on the image-capture device 120 via the focus lens 112. Then, the subject image is photo-electrically converted into electric signals by the image-capture device 120 and output to a subsequent image signal generator 122. The image-capture device 120 may include a CCD (Charge Coupled Devices), CMOS (Complementary Metal Oxide Semiconductor), and the like. The image-capture device driver 121 is one example of the image-capture device drive circuit that supplies drive signals to the image-capture device 120 for photo-electronically converting the subject image formed on the image-capture device 120 into signals. The drive signals are supplied based on a vertical direction synchronization signal VD, a horizontal direction synchronization signal HD, and a clock signal CLK generated from a clock signal generator that all used for a standard operation for each unit of the video camera.

In image signal generator 122, electric signals output from the image-capture device 120 are subject to appropriate signal processing, and image signals complied with a predetermined standard are generated. The image signals are transmitted to a subsequent circuit group (image signal processor 151) of the video camera.

The aforementioned processing is performed for each of three primary colors R (Red), G (Green), and B (Blue). For example, the camera block includes a color separating prism (not shown) located upstream of the image-capture device 120. The color separating prism separates light incident from the lens block into the three primary colors R, G, and B, and supplies the R component light to R component image-capture device, the G component light to G component light to G component image-capture device, and the B component light to B component image-capture device, respectively. In FIG. 2, the three R, G, and B component image-capture devices are represented as an image-capture device 120.

The subject images for each color formed on the image-capture device 120 are subject to predetermined processing before the subject images are photo-electrically converted into signals by the image-capture device 120 and output to the image signal generator 122. The image signal generator 122, for example, includes a preamplifier and an A/D (Analog/Digital) converter (not shown). The level of the electric signals input to the image signal generator 122 is amplified by the preamplifier, and correlated double sampling is performed on the signals to eliminate a reset noise. The A/D converter converts analog signals into digital image signals. Further, the image signal generator 122 is configured to perform gain control, black level stabilizer, or dynamic range control, and the like of the supplied image signals for each color, and supply the image signals thus obtained to the image signal processor 151.

The image signal processor 151 performs various signal processing of the image signals supplied from the image signal generator 122, and generates output image signals. For example, the image signal processor 151 performs knee correction to compress image signals at or above a certain level, gamma correction to set a correct level for image signals according to a configured gamma curve, and white clip processing or black clip processing to limit image signal levels to a predetermined range. The image signal processor 151 also performs edge enhancement processing or linear matrix processing, encode processing, or the like to generate output image signals in a desired format.

The image signal generator 122 having a preamplifier and A/D converter, the image signal processor 151, and the like perform respective processing using the vertical direction synchronization signal VD, the horizontal direction synchronization signal HD, and the clock signal CLK synchronized with the image signals supplied from the previous stage. The vertical direction synchronization signal VD, the horizontal direction synchronization signal HD, and the clock signal CLK may alternatively be obtained from the clock signal generator.

The control unit 130 includes, for example, a Central Processing Unit (CPU), a Random Access Memory (RAM), and a Read Only Memory (ROM), which are not shown in the figure. The control unit 130 reads out a program stored in the ROM onto the RAM and then executes the program to carry out predetermined control and processing of each unit in the video camera 100. The control unit 130 observes control information including statuses input from the image signal generator 122, the image signal processor 151, and the lens control unit 111, processing conditions, signal statuses (e.g., luminance levels and colors) and determines whether the values thereof are those which needs to perform warning to a user. This determination refers to standard values corresponding to information about the respective statuses previously stored in a memory 131. The memory 131 stores programs, preset values, and so on required for various processing of the video camera 100, such as the warning-determination programs as described later. The memory 131 may be a nonvolatile memory, such as a semiconductor memory.

The control unit 130 generates outputs of various command signals for warning when each value of the control-information signal is determined as one that should be warned. The command signals include warning-command signals for specifying the kinds of warning sounds, display-command signals for displaying on the viewfinder 101 characters, icons, or the like depending on the contents of the warning, and voice command signals as described above. The details of the process for warning determination and the process for transmitting a warning signal to the CCU 200 will be described later. In addition, the control unit 130 periodically transmits to a monitor driver 150 a display-command signal for displaying characters, icons, or the like on the viewfinder 101 depending on the contents of the warning.

A switch group 140 includes one or more switches and receives the operation from a user. Operations input from the switch group 140 allows parameters of the image signal generator 122, the image signal processor 151, and so on to be changed, a mode of a voice command signal as described above to be selected, the kind of a warning sound to be set, and so on. The presence or absence of any operation input from the switch group 140 is always observed by the control unit 130. Thus, the control unit 130 will detect the operation input from the switch group 140 and perform processing in response to the instruction.

A monitor driver 150 generates a drive signal for driving the view finder 101 and then supplies the generated drive signal to the view finder 101. When a display-command signal as described below is received from the control unit 130, an image signal input from the image signal processor 151 is superimposed with warning characters, icons, or the like, which indicate a warning depending on the contents of instruction of the display-command signal, and then supplied to the viewfinder 101.

The viewfinder 101 is driven by a drive signal input from the monitor driver 150, thereby displaying an image signal generated in the image signal processor 151. When a signal input from the monitor driver 151 is an image signal including any of characters, icons, or the like indicating a warning, an image may be displayed with superimposed characters, icons, or the like.

A voice amplifier 160 amplifies an output voice signal after voice-electric conversion over an incom microphone 104 and the amplified voice signal is then supplied to the frequency multiplexer 190 as described later. A warning sound generator 180 is designed so that various kinds of warning sounds may be generated using a plurality of frequency bands. When a warning-command signal is supplied from the control unit 130, a warning sound is selected corresponding to the input warning-command signal. The selected warning sound is transmitted as a warning-sound signal to a voice synthesizer 181. Here, according to the present embodiment, an example of setting a plurality of warning sounds on different frequency bands has been described. Alternatively, a plurality of warning sounds may be generated by other methods, such as one for generating a plurality of warning sounds with different intervals of sound on/off. In addition, the warning sound may be a synthesized human voice.

An IF unit converts a control signal input from the control unit 130 into a serial signal and then transmits to a frequency multiplexer 190. The respective signals discriminated at a frequency discriminator 191 as described later are transmitted to the respective units of the video camera 100. The frequency multiplexer 190 is provided as a transmitting unit. The frequency multiplexer 190 multiplexes a voice signal input from the voice amplifier 160, an image signal input from the imaging signal processor 151, and various kinds of command signals and control-information signals for the respective units input from the IF unit 170, followed by transmitting results to the CCU 200 through the transmission cable 1. The frequency discriminator 191 is provided as a receiving unit. The frequency discriminator discriminates frequency-multiplexed signals transmitted from the CCU 200 through the transmission cable 1, thereby extracting an incom-voice signal, a return video signal, or the like. The extracted incom-voice signal is transmitted to a voice synthesizer 181 and a return video signal is then transmitted to a monitor driver 150.

A voice synthesizer 181 combines a warning-sound signal input from the warning sound generator 180 with an incom-voice signal input from the frequency discriminator 191. The voice signal input from the control unit 130 determines a ratio of the sound volume of the warning-sound signal to that of the incom-voice signal. Thus, the voice command signal is generated in response to the user's operation using a series of switches 140. In this embodiment, the voice synthesizer 181 is designed to operate according to the following four modes with instructions of voice command signals.

First mode: the warning-sound signal is added to the incom-voice signal;

Second mode: the gain of the incom-voice signal is increased and added to the gain of the warning-sound signal that is reduced;

Third mode: the gain of the warning-sound signal is increased and added to the gain of the incom-voice signal that is reduced; and Fourth mode: if the level of incom voice is not less than a predetermined level, the gain of the warning-sound signal is made small or made zero.

Figure 3:
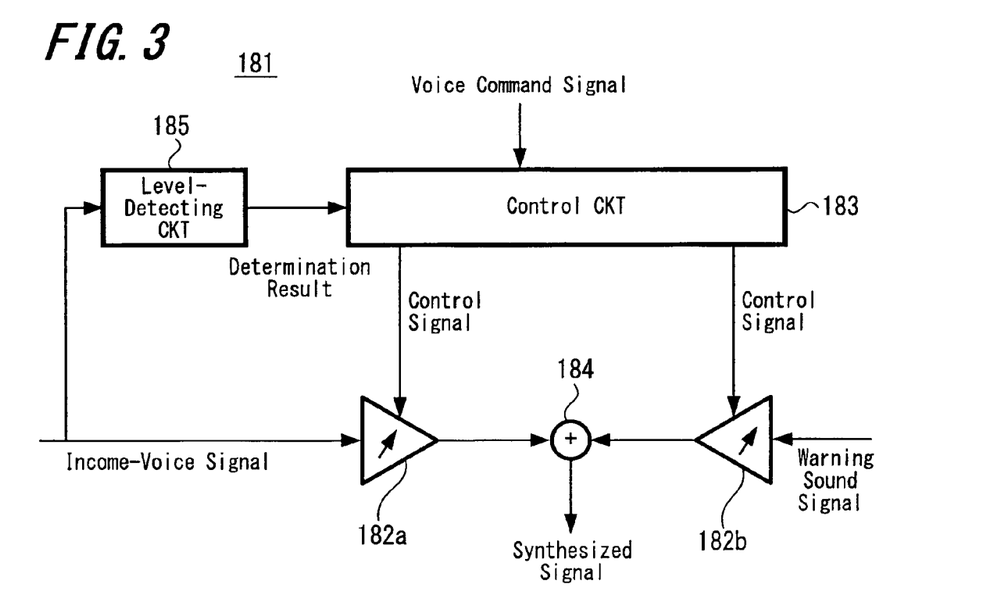
FIG. 3 is diagram illustrating a configuration example of a voice synthesizer according to the embodiment of the present invention.

FIG. 3 shows a configuration example of the voice synthesizer 181. As shown in FIG. 3, a variable gain amplifier 182*a* receives an input of an incom-voice signal and a variable gain amplifier 182*b* receives an input of a warning-sound signal. The voice command signal input from the control unit 130 is supplied to both the variable gain amplifiers 182*a* and 182*b*. The gains of the variable gain amplifiers 182*a* and 182*b* are changed based on the instruction of the voice command signal. An adding circuit 184 adds signals output from the respective variable gain amplifiers 182*a* and 182*b* and then transmits results as a combined signal to the incom headphone 103.

A level detecting circuit 185 detects the signal level of the incom-voice signal. When the operation using the switch group 140 selects the fourth mode, the level detecting circuit 185 detects the signal level of the incom-voice signal. When the signal level of the incom-voice signal detected by the level detecting circuit 185 is higher than a predetermined level, the variable gain amplifier 182*b* adjusts the gain of the input warning-sound signal to be reduced.

According to the embodiment, the operation mode of the voice synthesizer is specified through an input operation using the switch group 140. Conditions, thresholds, or the like for switching the respective modes may be previously set, so that the control unit 130 is allowed to determine and automatically switch the mode depending on the situation.

Next, referring back to FIG. 2, a configuration example of the CCU 200 will be described. A frequency discriminator 211 discriminates a frequency-multiplexed signal transmitted from the video camera 100 through the transmission line 1 and then transmits each of the extracted signals to respective units in the CCU 200. When the IF unit 230 receives control information from the control unit 240 to the video camera 100, the IF unit 230 converts the control information to a serial signal output to a frequency multiplexer 210. When the IF unit 230 receives a control-information signal or the like of the video camera 100 from a frequency discriminator 211, the IF unit 230 inputs a control-information single into the control unit 240. The monitor driver 220 superimposes characters, icons, or the like for warning in response to a command signal input from the control unit 240 onto an image signal discriminated at the frequency discriminator 211 and then transmits the superimposed signal to an external monitor 201.

A voice synthesizer 251 has a similar configuration to that of the voice synthesizer 181 of the video camera 100 and combines a warning-sound signal input from a warning-sound generator 250 and an incom-voice signal extracted at the frequency discriminator 211 in response to a voice-specifying signal input from the control unit 240.

The frequency multiplexer 210 multiplexes a return video signal input from the monitor driver 220 with control information input from the control unit 240 to be fed to the video camera 100. When an operator performs voice input over an incom microphone 203, an incom voice amplified in the voice amplifier 212 is also multiplexed and a resultant frequency multiplexed signal is transmitted to the video camera 100 through the transmission cable 1.

Figure 4:
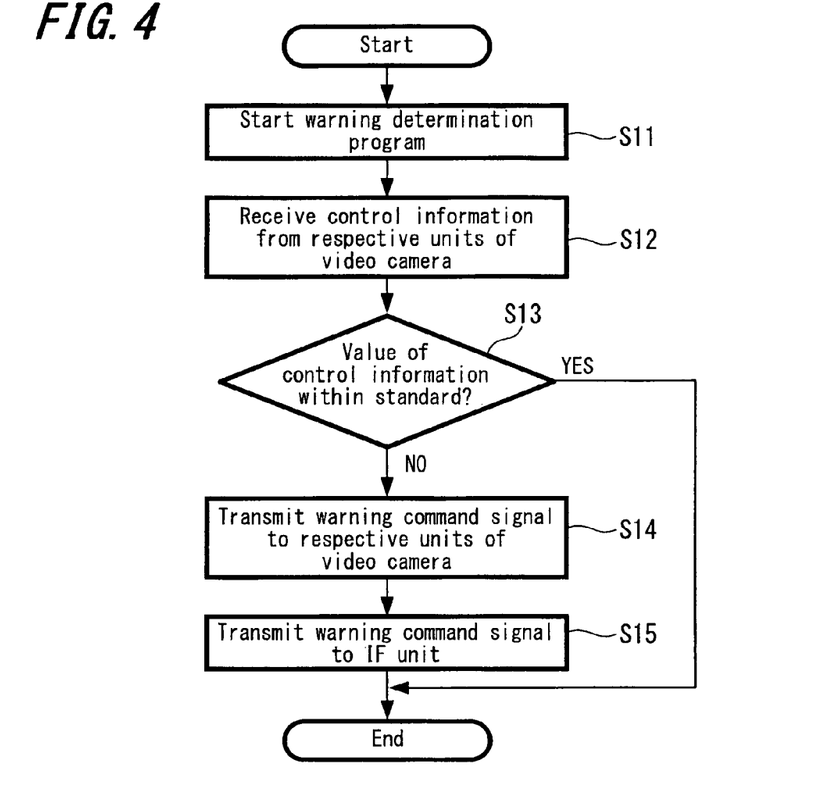
FIG. 4 is a flowchart illustrating an example of a warning determination program of the video camera according to the embodiment of the present invention.

Next, referring to the flowchart of FIG. 4, an example of a warning-determination process in the video camera 100 is described. At first, a warning-determination program is started under the control of the control unit 130 (step S11). Furthermore, the startup of the warning-determination program is programmed to carry out every 0.5 seconds, periodically. Subsequently, control information including status information is input from respective units of the video camera 100 to the control unit 130 (step S12). The control unit 130 reads a standard value for each piece of control information stored in the memory 131 and compares such standard value with a value of each piece of control information input from respective units to determine whether each control-information value varies from a standard (step S13). When each of the control-information values is determined to be within a range of standard values (step S13), the warning-determination program is terminated.

When each of the control-information values is determined to be out of the range of the standard values, the situation is determined that a warning should be sent to the photographer of the video camera 100 and a warning-command signal is transmitted to respective units of the video camera 100 (step S14). The command signals, which may be transmitted herein, include a display-command signal, a warning-command signal, and a voice command signal. In addition, each of the generated command signals is also transmitted to the IF unit 170 (step S15).

Figure 5:
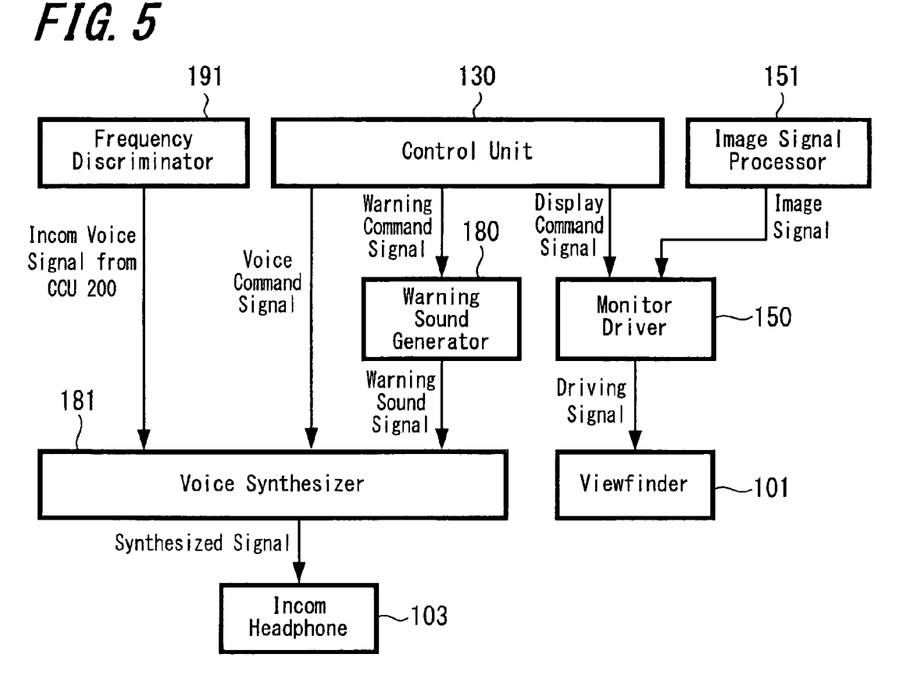
FIG. 5 is a schematic diagram illustrating an example of transmitting each command signal in the video camera according to the embodiment of the present invention.

Next, processing steps for each command signal after the warning-determination process in the video camera 100 will be described with reference to FIG. 5. In the case where the incom-voice signal from the operator of the CCU 200 has been multiplexed in various kinds of signals discriminated at the frequency discriminator 191, the incom-voice signal is discriminated and then input to the voice synthesizer 181. The voice command signal is generated in the control unit 130 in response to an input operation using the switches 140 and is fed to the warning sound generator 181. The warning-command signal generated in the control unit 130 is input to the warning sound generator 180. A warning sound designated by the warning-command signal is selected in the warning sound generator 180 and the selected signal is input as a warning sound signal into the voice synthesizer 181. The monitor driver 150 receives a display-command signal output from the control unit 130 and then prepares warning characters, icons, or the like in response to a display-command signal. The generated warning characters, icons, or the like are superimposed on the image signal input from the image signal processor 151. Subsequently, the image signal superimposed with the warning information represented by the warning characters or icons is displayed on the viewfinder 101 according to a drive signal generated in the monitor driver 150.

The voice synthesizer 181 adjusts the gain of the incom-voice signal input from the frequency discriminator 191 and the gain of the warning-sound signal input from the warning sound generator 180 on the basis of one of the first to fourth modes designated by the voice command signal and then combines them with each other. In the case where the voice command signal indicates the first mode, the voice synthesizer 181 simply combines the incom-voice signal with the warning-sound signal. In the case where the voice command signal indicates the second mode, the voice synthesizer 181 increases the gain of the incom-voice signal and lowers the gain of the warning-sound signal, followed by combining them with each other.

In the case where the voice command signal indicates the third mode, the voice synthesizer 181 extensively increases the gain of the warning voice signal and reduces the gain of the incom-voice signal, followed by combining both signals with each other. In the case where the voice command signal indicates the fourth mode, a level-detecting circuit 185 (FIG. 3) detects a signal level of the incom-voice signal at first. In the case where it is determined that the signal level of the incom-voice signal is not less than a predetermined level, the gain of the warning-sound signal is adjusted to be small or the gain of the warning sound signal is adjusted to be zero. In the case where it is determined that the signal level of the incom-voice signal does not reach a predetermined level, the warning-sound signal is simply combined with the incom-voice signal. Then, the combined signal prepared in the voice synthesizer 181 is output from the incom headphone 202.

A malfunction is not only displayed on the viewfinder 101 but also informed a photographer of the video camera 100 as a warning sound. Therefore, as compared with a case where the warning information is only informed by display, the certainty of allowing the photographer of the video camera 100 to be informed about the malfunction caused in the video camera 100 is improved.

In addition, a voice command signal is generated in response to an input operation using the switch group 140 and both the gain of the incom-voice signal and the gain of the warning-sound signal are adjusted on the basis of a mode corresponding to the voice command signal. Therefore, the user is allowed to determine the loudness of incom sound and the loudness of warning sound from the operator of the CCU 200 based on the user's situation and preference of the user.

Furthermore, according to the present embodiment, the gain of the warning-sound signal is adjusted to be small in the case where the signal level of the incom-voice signal is detected to be not less than a predetermined level. However, the user may modify the conditions or alter signals to be adjusted, or the like.

Figure 6:
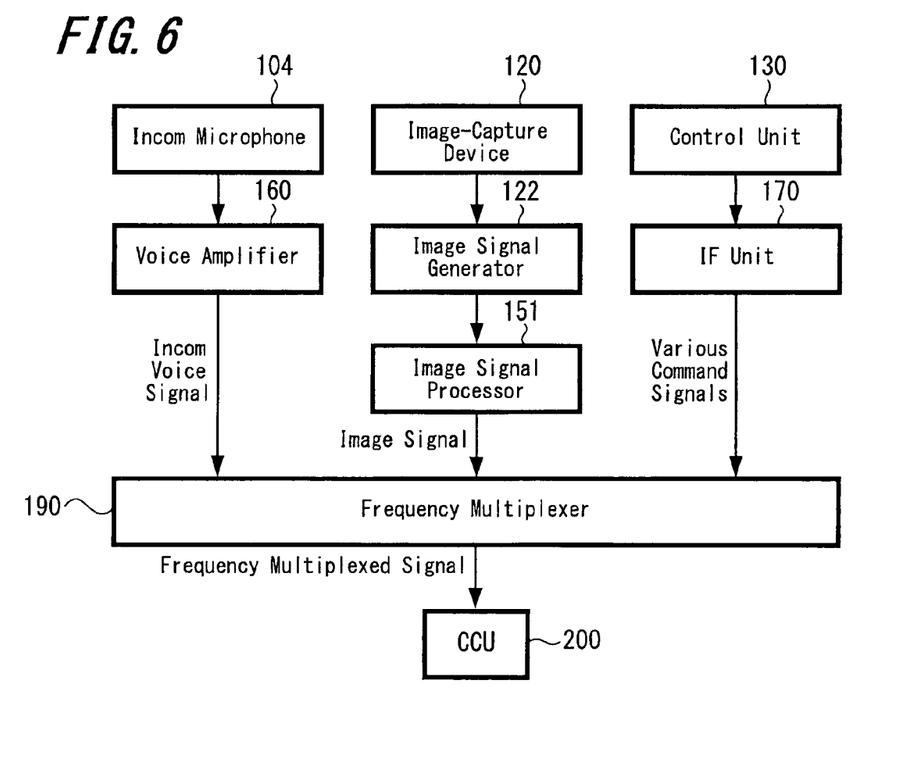
FIG. 6 is a schematic diagram illustrating an example of transmitting various kinds of signals from the video camera to the CCU according to the embodiment of the present invention.

Next, processing steps of transmitting various kinds of command signals and image signals from the video camera 100 to the CCU 200 will be described with reference to FIG. 6. In the case where the photographer of the video camera 100 inputs an incom voice over the incom microphone 104, the incom-voice signal is amplified at the voice amplifier 150 and then input into the frequency multiplexer 190. Imaging light captured by the image-capture device 120 is converted into an image signal at the image signal generator 122. Subsequently, the image signal is processed in the image signal processor 151, followed by being input into the frequency multiplexer 190. Furthermore, each command signal generated in the control unit 130 is input into the frequency multiplexer 190 through the IF unit 170. The frequency multiplexer 190 multiplexes the respective input signals and then transmitting them to the CCU 200 through the transmission line 1.

Figure 7:
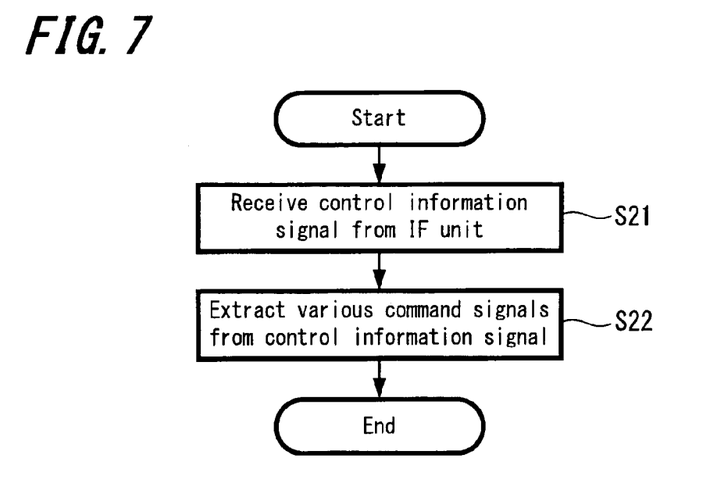
FIG. 7 is a flowchart illustrating a process example of extracting warning information of the CCU according to the embodiment of the present invention.

Next, referring now to the flow chart in FIG. 7, an example of extracting and processing warning information in the case where the CCU 200 receives a frequency-multiplexed signal containing a control-information signal from the video camera 100 will be described. At first, the control-information signals extracted at the frequency discriminator 211 are input to the control unit 240 through the IF unit 230 (step S21) and various kinds of command signals are then extracted from the control-information signals (step S22).

Figure 8:
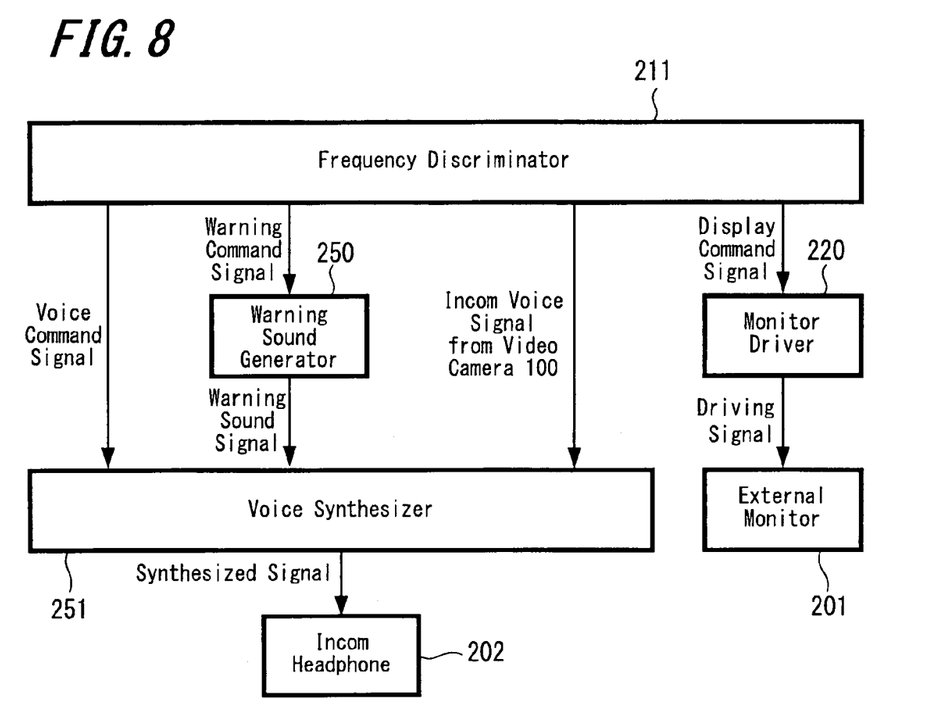
FIG. 8 is a schematic diagram illustrating an example of transmitting each command signal in the CCU according to the embodiment of the present invention.

Next, processing steps for each command signal in the CCU 200 will be described with reference to FIG. 8. A voice command signal discriminated in the frequency discriminator 211 is input to the voice synthesizer 251. In the case where the frequency-multiplexed signal input in the frequency discriminator 211 is multiplexed on the incom-voice signal from the photographer of the video camera 100, the incom-voice signal is extracted and the extracted incom-voice signal is input to the voice synthesizer 251. A display-command signal discriminated in the frequency discriminator 211 is input to the voice synthesizer 251. Warning characters, icons, or the like are generated in the monitor driver 220 in response to the display-control signal. The generated characters, icons, or the like are then superimposed on the image signal extracted at the frequency discriminator 211. The image signal, on which the information such as the warning characters, icons, or the like is superimposed, is displayed on the external monitor 201 based on the drive signal generated in the monitor driver 220.

Figure 9:
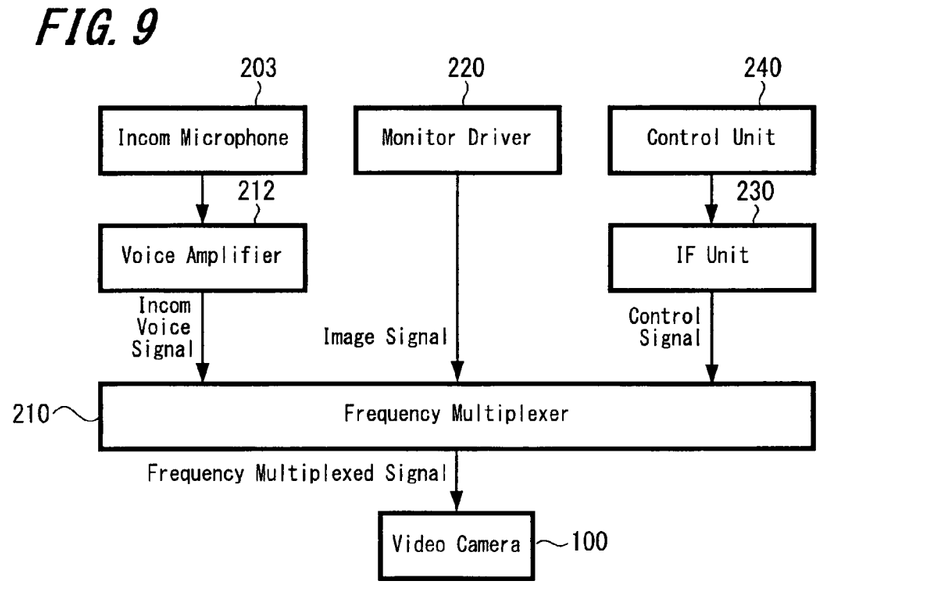
FIG. 9 is a schematic diagram illustrating an example of transmitting various kinds of signals from the CCU to the video camera according to the embodiment of the present invention.

FIG. 9 illustrates processing steps for an image signal and a control signal for the video camera 100 from the CCU 200 to the video camera 100. When the operator of the CCU 200 provides an incom voice input over the incom microphone 203, the incom-voice signal is amplified in the amplifier 212 and then input into the frequency multiplexer 210. A return video signal output from the monitor driver 220 is input into the frequency multiplexer 210. In addition, a control signal for controlling the video camera 100 is input into the frequency multiplexer 210 through the IF unit 170. In the frequency multiplexer 210, various kinds of input signals are multiplexed and respective signals multiplexed are transmitted to the video system 100 through the transmission line 1.

Therefore, a malfunction caused in the video camera 100 is not only displayed on the external monitor 201 connected to the CCU 200 but also informed the operator of the CCU 200 as warning sound to the incom headphone 202, so that certainty of informing the operator of the CCU 200 of the malfunction of the video camera will be improved.

Furthermore, the operator of the CCU 200 is informed of any malfunction caused in the video camera 100 by representation of warning information on the external display monitor of the CCU 200 or a warning voice over the incom headphone. Accordingly, in the case where the photographer of the video camera 100 overlooks warning information, the operator of the CCU 200 is allowed to promote attention by a voice to the photographer of the video camera 100.

Therefore, when the photographer of the video camera 100 continues shooting while the subject is being out of focus without noticing the warning information, for example, the situation of continuing shooting while a subject is out of focus can be prevented.

According to the present embodiment, a command signal generated in response to control information for respective units of the video camera 100 is transmitted from the video camera 100 to the CCU 200. Alternatively, control information may be directly transmitted from the video camera 100 to the CCU 200 and whether a value of the control information requires a warning or not may be determined in the CCU 200. An example of the warning-determination process of the CCU 200 in this case will be described with reference to the flow chart in FIG. 10.

Figure 10:
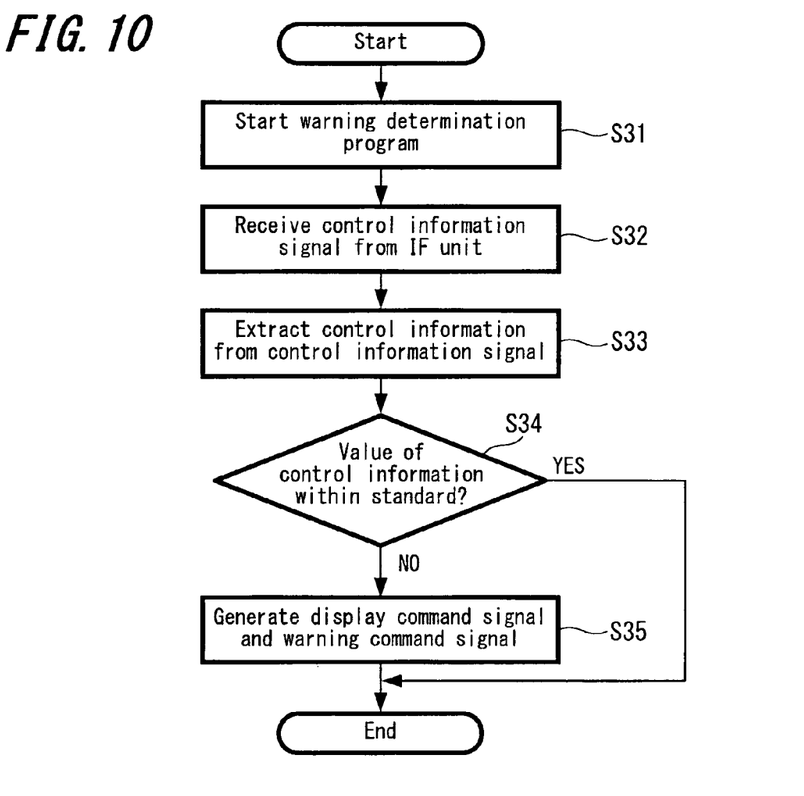
FIG. 10 is a flowchart for illustrating an example of a warning determination program of the CCU according to a modified embodiment of the present invention.

At first, a warning-determination program is initiated in the CCU 200 (step S31). Then, the control-information signal extracted at the frequency discriminator 211 is input into the control unit 240 through the IF unit 230 (step S32). From the control-information signals, control information including status information of respective units of the video camera 100 is extracted (step S33). Next, whether a value of the extracted status information is within a range of predetermined standard values is determined (step S34). If it is determined to be within the predetermined range, the warning-determination problem is terminated. If it is determined to be out of the range of standard values, the control unit 240 generates both a display-command signal and a warning-command signal (step S35).

Figure 11:
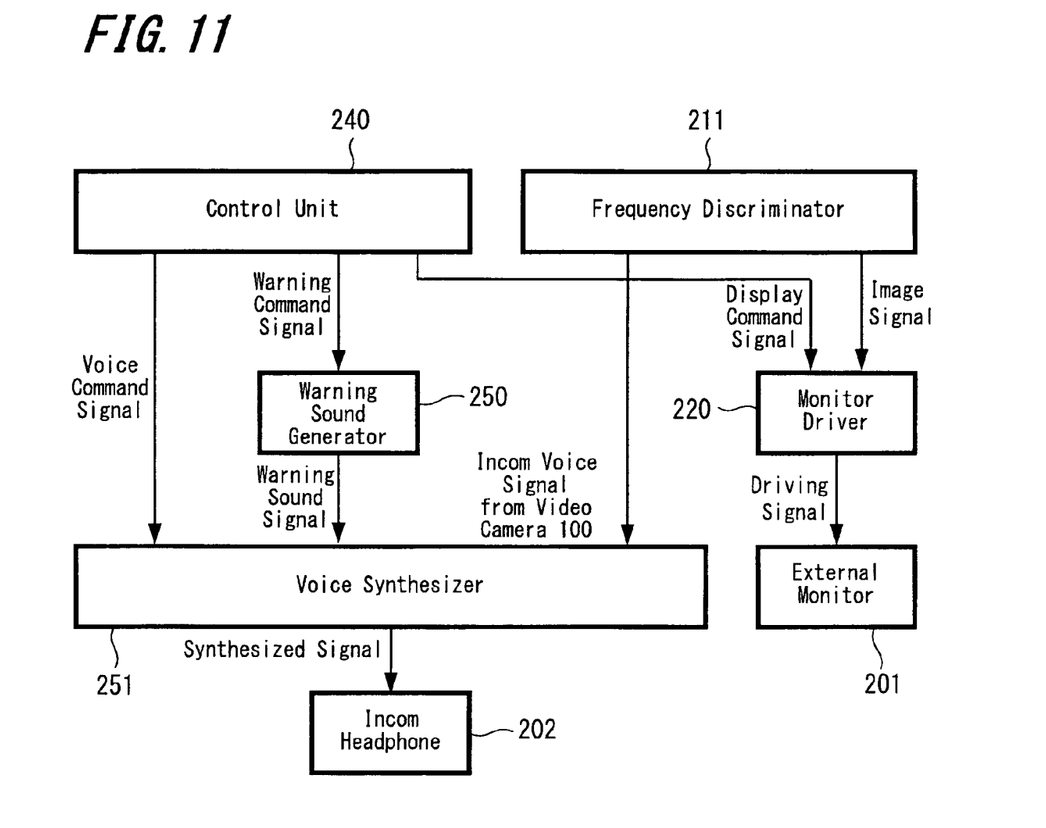
FIG. 11 is a schematic diagram for illustrating an example of transmitting each command signal in CCU according to the modified embodiment of the present invention.

Next, processing steps for various kinds of command signals in the CCU 200 will be described with reference to FIG. 11. The control unit 240 generates a voice command signal, a warning-command signal, and display-command signal. The voice command signal is input to the voice synthesizer 251. The warning-command signal is input to the warning-sound generator 250. In the warning generator 180, a warning sound designated by the warning-command signal is selected and the selected warning sound is then input as a warning-sound signal to the voice synthesizer 251. The display-command signal is input to the monitor driver 220 where warning characters, icons, or the like are generated in response to the display-command signal. The generated characters, icons, or the like are superimposed on an image signal extracted at the frequency discriminator 211. The image signal, on which warning information such as warning characters or icons is superimposed, is displayed on the external monitor 201 in response to a drive signal generated at the monitor driver 220. Processing steps of transmitting the image signal and the control signal to the video camera 100 from the CCU 200 is similar to those described in FIG. 9, so that the description will be omitted.

In addition, according to the embodiment of the present invention described above, a frequency-multiplexing process is used for multiplexing signals transmitted between the video camera and the CCU. Alternatively, a time-division multiplexing may be used.

Figure 12:
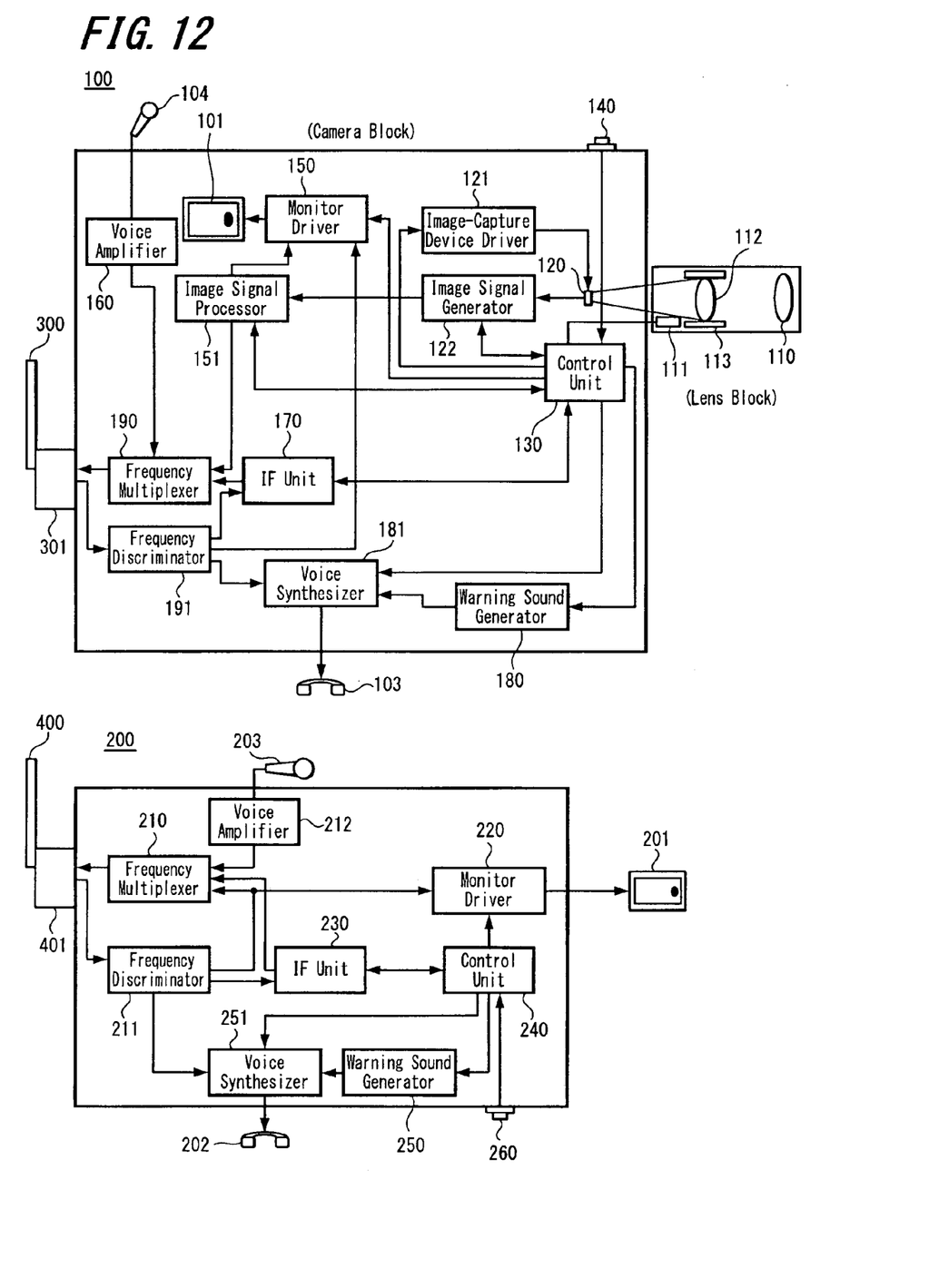
FIG. 12 is a block diagram illustrating a configuration example of both the video camera and the CCU according to the modified embodiment of the present invention.

Furthermore, according to the embodiment of the present embodiment described above, the transmission cable is employed to connect the video camera and the CCU. Alternatively, the transmission may be carried out using a wireless transmission. FIG. 12 shows a configuration example of a video camera and a CCU in such a case. The same reference numerals are given to portions in FIG. 12 corresponding to those in FIG. 2, so that the descriptions thereof will be omitted. Instead of the transmission cable, a video camera 100 in FIG. 12 includes a radio-signal-receiving antenna 300 and a radio-signal transmitting/receiving unit 301. A CCU 200 also includes a radio-signal-receiving antenna 400 and a radio-signal transmitting/receiving unit 401. Accordingly, a signal is transmitted between the video camera 100 and the CCU 200 through a space transmission channel. In addition, if signals are transmitted between the video camera 100 and the CCU 200 by wireless communication, signals to be transmitted may be multiplexed in coding multiplex.

Furthermore, according to the embodiments described above, a lens is included in the main body of the video camera. Alternatively, however, a detachable lens may be employed.

Furthermore, according to the embodiments described above, as shown in FIGS. 2 and 12, the video camera and the CCU both include the voice synthesizer, however, the voice synthesizer may be included in one of the video camera and the CCU.

It should be understood by those skilled in the art that various modifications, combinations, sub-combinations and alterations may occur depending on design requirements and other factors insofar as they are within the scope of the appended claims or the equivalents thereof.

What is claimed is:

1. An image-capture apparatus including an intercom connecting unit, capable of voice communication with an external camera control unit through an intercom connected to the intercom connecting unit, comprising:
    a control unit that outputs a warning-command signal in the case of determining that a value of a control-information signal indicating a state of the image-capture apparatus varies from a predetermined standard;
    a warning-sound signal generator that receives the warning-command signal output from the control unit and outputs a warning-sound signal corresponding to the warning-command signal;
    a receiving unit that receives a multiplexed signal transmitted from the camera control unit and extracts an intercom-voice signal from the multiplexed signal;
    a voice synthesizer that combines the intercom-voice signal extracted at the receiving unit with the warning-sound signal input from the warning-sound signal generator to generate a voice-synthesized signal; and
    a transmitting unit that multiplexes the warning-command signal, the control-information signal, and the intercom-voice signal of the image-capture apparatus and transmits a multiplexed signal to the camera control unit.

2. An image-capture apparatus according to claim 1, wherein
    the voice-synthesized signal generated at the voice synthesizer is output to an intercom headphone of the image-capture apparatus.

3. An image-capture apparatus according to claim 1, wherein
    the warning-sound signal generator selects a signal designated by the command signal from a plurality of warning-sound signals previously prepared.

4. An image-capture apparatus according to claim 1, wherein
    the voice synthesizer alters a gain of the intercom-voice signal and a gain of the warning-sound signal in response to the command signal.

5. An image-capture apparatus according to claim 4, further comprising:
    a signal-level detector that detects an output level of the intercom-voice signal, wherein
    the voice synthesizer alters a gain of the intercom-voice signal and a gain of the warning-sound signal in response to the output level of the intercom-voice signal detected by the signal-level detector.

6. An image-capture apparatus according to claim 4, further comprising:
    at least one operating device, wherein
    the command signal is generated in response to an input operation using the operating device.

7. An image-capture apparatus according to claim 1, further comprising:
    an image signal processor that performs predetermined processing on a captured image signal and outputs an image signal, wherein
    the transmitting unit multiplexes the image signal input from the image signal processor with the control information and transmits a multiplexed signal to the camera control unit.

8. A camera control unit that receives an image signal from a connecting image-capture apparatus, controls the image-capture apparatus transmitting the image signal, and performs a voice communication with an intercom connected to the image-capture apparatus, comprising:
    a receiving unit that receives a multiplexed signal transmitted from the image-capture apparatus and extracts an intercom-voice signal, a warning-command signal, and a control-information signal from the multiplexed signal;
    a warning-sound signal generator that outputs a warning-sound signal in response to the warning-command signal extracted at the receiving unit;
    a voice synthesizer that combines the intercom-voice signal extracted at the receiving unit with the warning-sound signal output from the warning-sound signal generator to generate a voice-synthesized signal; and
    a transmitting unit that multiplexes an intercom voice of the camera control unit and control information for controlling the image-capture apparatus and transmits a multiplexed signal to the image-capture apparatus.

9. A camera control unit according to claim 8, wherein
    the voice-synthesized signal generated at the voice synthesizer is output to an intercom headphone of the camera control unit.

10. A camera control unit according to claim 8, wherein
    the warning-sound signal generator selects a signal designated by the command signal from a plurality of warning-sound signals previously prepared.

11. A camera control unit according to claim 8, wherein
    the voice synthesizer alters a gain of the intercom-voice signal and a gain of the warning-sound signal in response to the command signal.

12. A camera control unit according to claim 11, further comprising:
    a signal-level detector that detects an output level of the intercom-voice signal, wherein
    the voice synthesizer alters a gain of the intercom-voice signal and a gain of the warning-sound signal in response to the output level of the intercom-voice signal detected by the signal-level detector.

13. A camera control unit according to claim 11, further comprising at least one operating device, wherein
    the command signal is generated in response to an input operation using the operating device.

14. A camera control unit according to claim 8, further comprising:
    a control unit that determines whether a value of the control information extracted at the receiving unit varies from a standard when signals extracted at the receiving unit do not include warning-command information and outputs the warning-command signal when determining that the value of the control information varies from the standard.

15. A video camera system comprising an image-capture apparatus capable of connecting to an intercom and a camera control unit that controls the image-capture apparatus, wherein the image-capture apparatus includes a control unit that outputs a warning-command signal in the case of determining that a value of a control-information signal indicating a state of the image-capture apparatus varies from a predetermined standard;

a warning-sound signal generator that receives the warning-command signal output from the control unit and outputs a warning-sound signal corresponding to the warning-command signal;

a receiving unit that receives a multiplexed signal transmitted from the camera control unit and extracts an intercom-voice signal from the multiplexed signal;

a voice synthesizer that combines the intercom-voice signal extracted at the receiving unit with the warning-sound signal input from the warning-sound signal generator to generate a voice-synthesized signal; and a transmitting unit that multiplexes the warning-command signal, the control-information signal, and the intercom-voice signal of the image-capture apparatus and transmits a multiplexed signal to the camera control unit, and wherein the camera control unit includes a receiving unit that receives a multiplexed signal transmitted from the image-capture apparatus and extracts the intercom-voice signal, the warning-command signal, and the control-information signal from the multiplexed signal;

a warning-sound signal generator that outputs a warning-sound signal in response to the warning-command signal extracted at the receiving unit;

a voice synthesizer that combines the intercom-voice signal extracted at the receiving unit with the warning-sound signal output from the warning-sound signal generator; and a transmitting unit that multiplexes an intercom voice of the camera control unit with control information for controlling the image-capture apparatus and transmits a multiplexed signal to the image-capture apparatus.

16. A method of transmitting warning information between an image-capture apparatus and a camera control unit that controls the image-capture apparatus, comprising the steps of:

on the image-capture apparatus, outputting a warning-command signal in the case of determining that a value of a control-information signal indicating a state of the image-capture apparatus varies from a predetermined standard, outputting a warning sound in response to the warning-command signal, combining an intercom-voice signal extracted at a receiving unit with a warning-sound signal and outputting a combined signal, and multiplexing the warning-command signal, the control-information signal, and the intercom-voice signal of the image-capture apparatus and transmitting a multiplexed signal to the camera control unit; and on the camera control unit, extracting the warning-command signal from the multiplexed signal input from the image-capture apparatus, outputting a warning sound in response to the warning-command signal, combining the intercom-voice signal extracted at the receiving unit with the warning-sound signal and generating a voice-synthesized signal, and multiplexing an intercom voice of the camera control unit with control information for controlling the image-capture apparatus and transmitting a multiplexed signal to the image-capture apparatus.

* * * * *